T. A. REDICK.
SHIPPING CRATE.
APPLICATION FILED OCT. 16, 1907.
925,507.
Patented June 22, 1909.
2 SHEETS—SHEET 1.
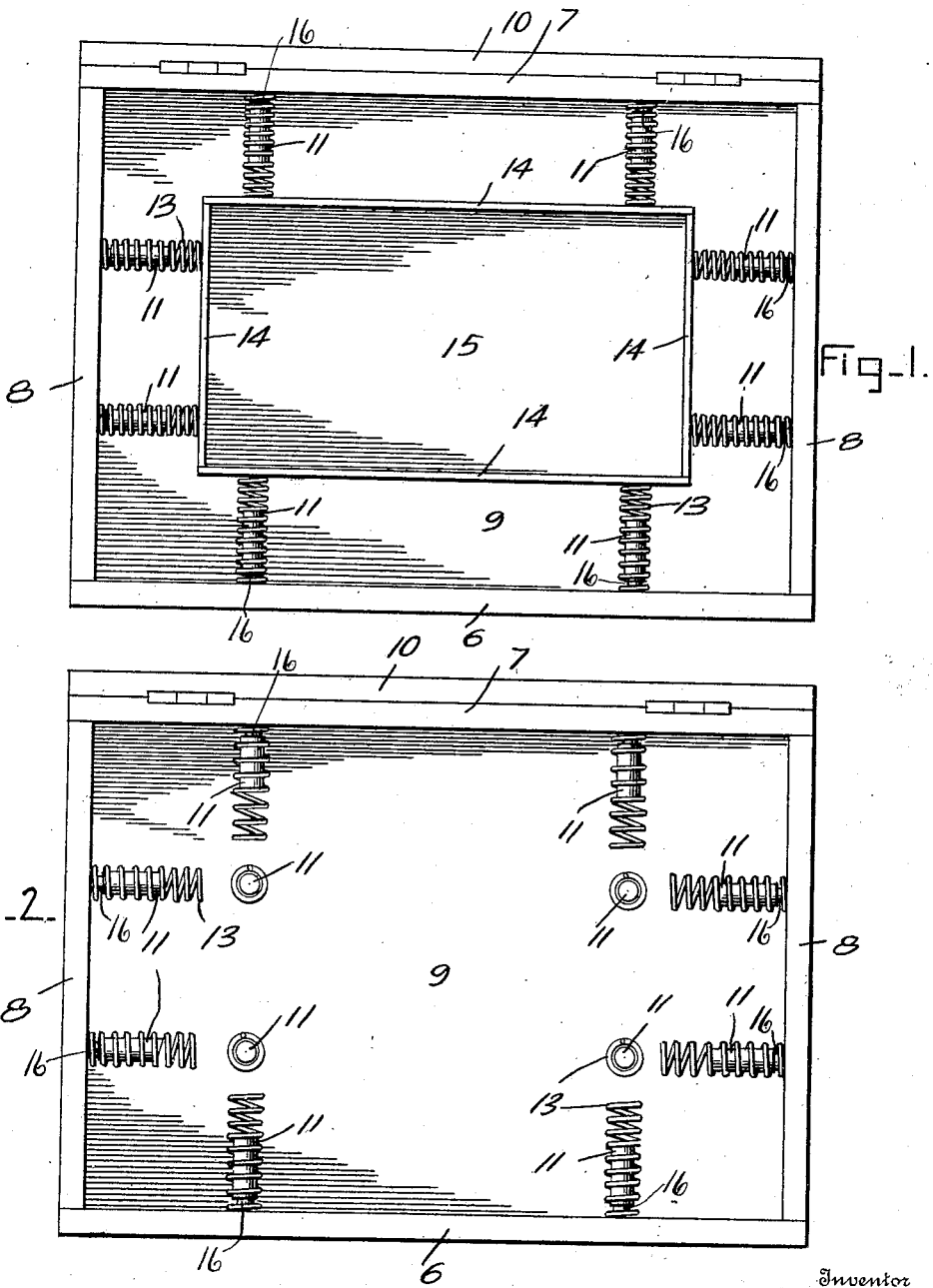

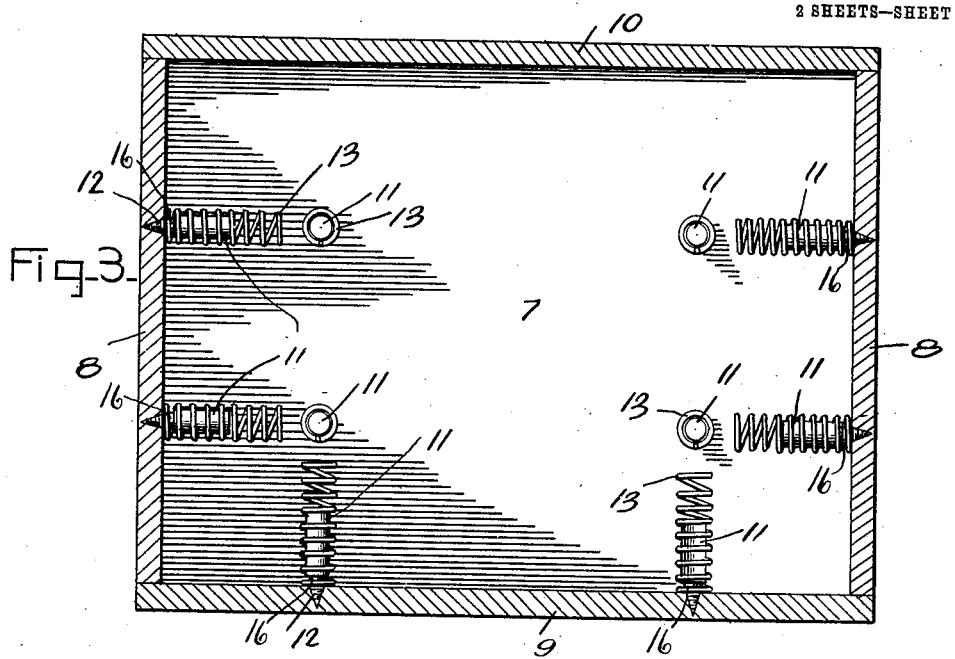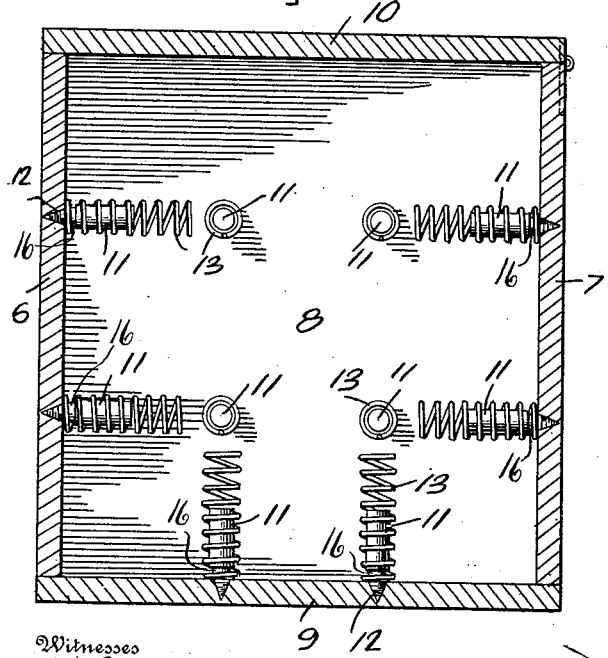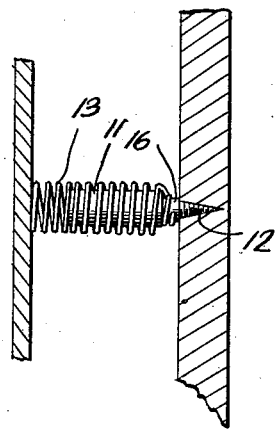

UNITED STATES PATENT OFFICE.

THOMAS A. REDICK, OF CHASE CITY, VIRGINIA.

SHIPPING-CRATE.

No. 925,507.  Specification of Letters Patent.  Patented June 22, 1909.

Application filed October 16, 1907. Serial No. 397,726.

*To all whom it may concern:*

Be it known that I, THOMAS A. REDICK, a citizen of the United States, residing at Chase City, in the county of Mecklenberg, State of Virginia, have invented certain new and useful Improvements in Shipping-Crates; and I do hereby declare the following to be a full, clear, and exact description of the invention, such as will enable others skilled in the art to which it appertains to make and use the same.

This invention relates to shipping crates and more particularly to a crate designed for the shipping of eggs and the primary object of the invention is to provide a shipping crate of such character that rough handling during transit will not be liable to break the eggs or other frangible articles shipped therein.

In carrying out my invention and with a view to attaining the object mentioned above, I provide an outer box and an inner or inclosed box, container, or crate, and secure upon each of the sides and upon the bottom of the outer box a plurality of pins over which are engaged helical springs which are of greater length than the pins and which bear against the bottom and sides of the egg container or inner box. I have found that it is advisable to arrange the springs, upon each side, end or bottom, in the form of a rectangle as by this construction, the inner box or egg container will not be liable to shift and thereby result in a side stress upon the springs which would, of course, render them in time ineffective.

In the accompanying drawings, Figure 1 is a top plan view of the crate with the top or cover swung to open position, Fig. 2 is a similar view but with the inner box or egg container removed, Fig. 3 is a vertical longitudinal sectional view through the crate, the inner box being removed, Fig. 4 is a similar view but taken transversely of the box, and, Fig. 5 is a detail vertical sectional view through a portion of one of the walls of the box showing a slightly enlarged detail of one of the pins and its spring.

As shown in the drawings and as heretofore stated, the shipping crate embodied in my invention is comprised of an outer box and an inner box or egg container and the outer box comprises a front 6, a back 7, sides 8, a bottom 9, and a top 10, the latter being hinged at its rear edge to the upper edge of the back 7. A plurality of pins are secured upon the inner wall and the bottom of the outer box just described and each of these pins comprises a shank 11 having an integral threaded stud 12 which is screwed into one of the walls or the bottom, the reduced threaded stud forming, in conjunction with that end of the shank 11 from which it projects, a shoulder which abuts the inner face of the said wall and firmly holds the pin in place.

Engaged upon each of the pins is a helical spring 13 which is of greater length than the pin and these springs 13 bear against the walls of the inner box or egg container and serve to hold said container yieldably centered in its protective casing which is the box just described. Each of these pins is provided between its shank 11 and its threaded stud 12 with an annularly reduced portion 16. When the pin is screwed into the wall of the outer or protective box of the crate, a groove will be formed between the wall and the shoulder resulting from the formation of the reduced portion 16 and it is into this groove that one end of the corresponding spring 13 is bent, it being understood that the spring is in this manner held against accidental displacement from the pin.

The egg container mentioned above comprises four walls 14 and a bottom 15 and I have found it expedient to arrange the pins upon each of the walls of the outside or protective box in rectangular formation so that they will bear, in this relationship, against the corresponding walls of the inner box or egg container. The advantage of this construction will be readily apparent if it be considered that if the pins upon each of the walls of the outer box should be arranged in a straight line either in a horizontal or a vertical direction, movement of the egg container from side to side or vertically would result in a twisting of the springs and this twisting would in time so weaken the springs that they would become ineffective.

From the foregoing description of my invention it will be seen that I have provided a crate comprising an egg container and an outer box or protective casing for the container within which the container is yieldably supported and it will be understood that this construction obviates breaking of the eggs due to rough handling of the crate in transit.

What is claimed, is—

A shipping receptacle of the class described comprising an outer or protective box, and an inner box or receptacle, pins formed each with a threaded extension and reduced adjacent said extensions, the pins having their extensions screwed into the walls of the outer box, springs engaged upon the pins and coiled at one of their ends around the reduced portions of the respective pins, the free ends of the springs bearing against the walls of the inner box.

In testimony whereof, I affix my signature, in presence of two witnesses.

THOMAS A. REDICK.

Witnesses:
HARRIE WINTFIELD,
R. D. PATTERSON.